DEVICE FOR RECORDING TELEVISION IMAGES

Filed Nov. 15, 1965

INVENTOR.
ZOLTAN KAUFMAN
BY
Brown, Critchlow, Flick & Peckham
ATTORNEYS.

3,333,277

DEVICE FOR RECORDING TELEVISION IMAGES

Zoltan Kaufman, 1172 Stanton Terrace, Pittsburgh, Pa. 15201

Filed Nov. 15, 1965, Ser. No. 507,891
4 Claims. (Cl. 346—107)

ABSTRACT OF THE DISCLOSURE

The device of this invention includes a light transmitting element, having a front face and a back face, which is adapted to be manually held in front of a television receiver with its front face in contact with the viewing window. This element comprises a multiplicity of substantially straight, parallel, open-ended tubes or passages extending between the front and back faces. Its function is to limit the light passing through the element to light rays that are substantially parallel to the axes of the tubes or passages. A sheet of light sensitive film is removably supported against the back face of the light transmitting element, and means are provided for permitting light to reach the film only from the front of the device and only when the desired exposure is to be made.

This invention relates to a device for photographically recording a designated image or symbol projected on a television screen; for the purpose, among others, of proving that the person using the device had been among the viewers watching a certain television program. The invention may be used, for example, in connection with promotional and educational television for the purpose of attracting a greater television audience for a given program.

In the exemplary use mentioned above, the device of the invention is intended to be distributed to a very large number of potential television viewers, who are instructed to watch a particular program where prizes will be awarded to certain members of the viewing audience. During that program a designated image or symbol is projected on a portion of the television screen. At this point, viewers are instructed to hold the device, properly oriented, against the screen or viewing window of their television receivers. The device includes means operable by the viewer for exposing a light sensitive film to the designated image or symbol to record it and for terminating the exposure and preserving the latent image for future development.

The device of this invention is intended to be distributed to millions of people at nominal or no charge, to be used once, and then disposed of. These conditions require that the device be very inexpensive to manufacture, easy to distribute, and simple to use. It is among the objects of this invention to provide such a device.

Figure 1:
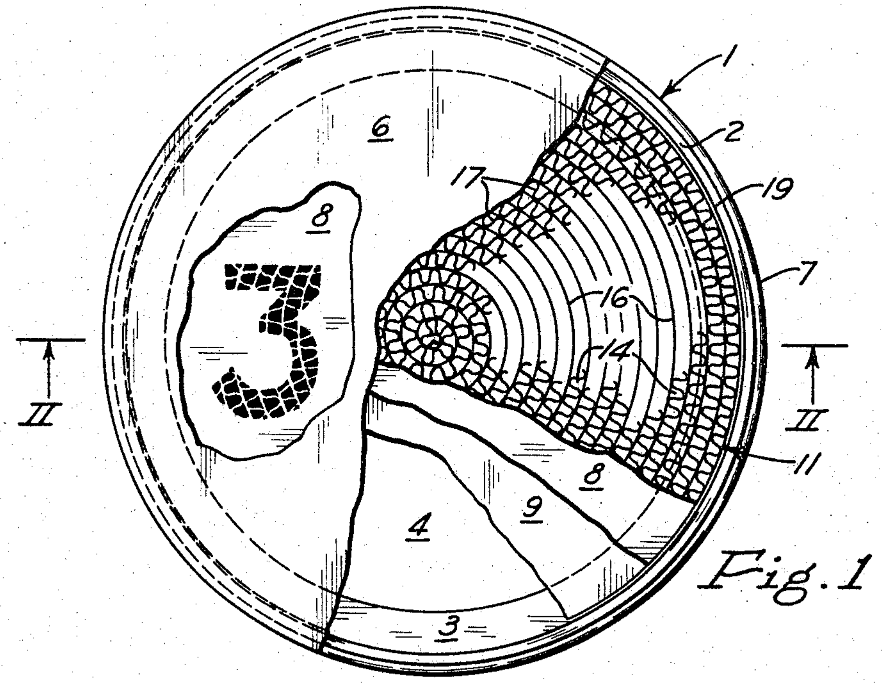
Figure 2:
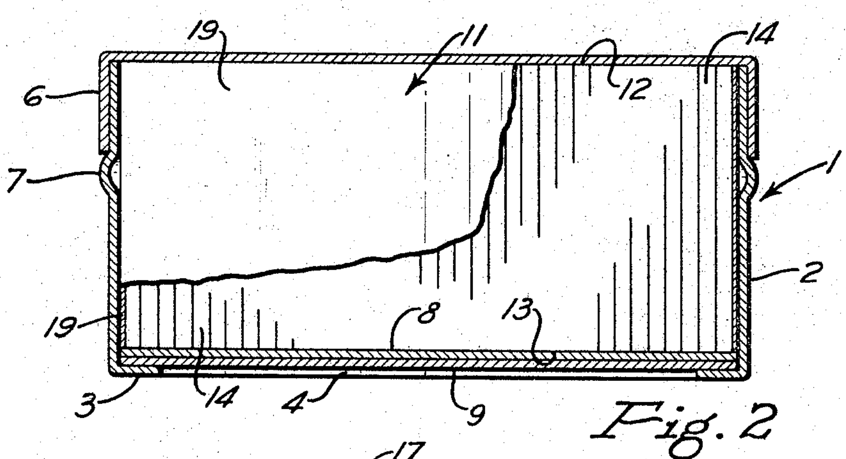
Figure 3:
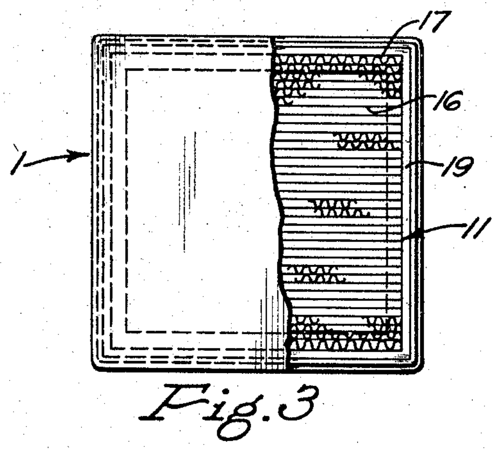

Other objects will be apparent from the following description of a preferred embodiment of the invention, in connection with the attached drawings, in which FIG. 1 is an enlarged, fragmentary, plan view of the device, with certain layers broken away to show details of the construction in depth;

FIG. 2 is a fragmentary, sectional elevation along the line II—II of FIG. 1; and FIG. 3 is a fragmentary plan view, on a reduced scale, of a modified form of the invention.

Referring to the drawings, the device of this invention includes a casing or box 1, which may be made of paper, metal, plastic, or other appropriate material. In one form, the casing has a cylindrical side wall 2, an annular back 3 provided with a central opening 4, and a removable cover 6. A ridge 7 formed around the side wall acts as a stop for the cover. Disposed inside the casing 1 is a light sensitive film 8, which may be an opaque paper coated with a suitable photographic emulsion. Preferably, but not necessarily, a stiff, opaque, backing member 9 underlies the film sheet and is disposed between it and the apertured back of the casing. Also received within the casing is a light-transmitting element 11, having a front face 12 and a back face 13. The back face of this element is in contact with the light-sensitive side of the film sheet 8, and its front face may extend flush with the front end of the casing.

The light-transmitting element 11 includes a multiplicity of substantially straight, parallel, open-ended tubes or passages 14 extending between the front and back faces 12 and 13 and preferably normal thereto. Tubes 14 are preferably made by superimposing alternate layers of flat 16 and corrugated 17 paper strips to provide a closely packed bundle of openings extending from edge to edge of those strips. As shown in FIGS. 1 and 2, these strips have been wound in a spiral arrangement to form a substantially cylindrical light-transmitting element. However, if desired, the corrugated and flat paper strips can be arranged in substantially rectilinear rows to form a square light-transmitting element, as shown in FIG. 3.

Since the purpose of the device is merely to record and identify designated images or symbols projected on a television screen, it is necessary only that the image transmitted to the film strip 8 be clear enough to be legible. Accordingly, the function of the tubes or passages 14 is to limit the light passing through the element to those light rays that are substantially parallel to the axes of said tubes, thereby transmitting a sharper, although somewhat interrupted, image to the light-sensitive film. For purposes of illustration, the symbol "3" is shown in FIG. 1, as it might appear on the surface of the light sensitive film 8 after recording and development of the latent image. It has been found that corrugated paper having a size known in the trade as "E-flute" provides a satisfactory tube or passage diameter for a passage length of about at least ¾" which will cut out unwanted angular light rays and prevent them from reaching the light-sensitive film. The surfaces of the paper strips 16 and 17 are preferably colored a dull black to minimize internal reflections inside the tubes 14.

The device is assembled under conditions that will not expose the light-sensitive emulsion of the film strip 8. When assembled, it is light-proof and can be distributed and stored until ready for use. In a typical use of the device, the viewer follows instructions given by an announcer on a television program, removes the cover 6 when told to do so, then promptly holds the device with the front end 12 of the light-transmitting element against the viewing window of his television receiver over the designated image or symbol that has been projected on the television screen. Since the emulsion speed of the film 8 is preferably relatively slow and non-critical, the device may be held in place during a countdown by the announcer, then removed and the cover put back on the casing. The exposed film can later be processed to prove that the viewer was watching a given television program, which, if other conditions are satisfied, may qualify the viewer for a prize. The opening 4 in the back of the casing provides means for enabling the viewer to write his name and address on the back of the film strip. When such identification is important, it is desirable that the film strip 8 and the backing strip 9 either be one integral piece or be bonded together, so that the identifying symbol will remain with the film as it is processed. The opening in the back of the casing also makes it easier to remove the light-transmitting and light-sensitive elements from the casing. It may also be desirable, to facilitate assembling and handling the light-transmitting element, to wrap a tape 19 around its layers of flat and corrugated strips to hold them together in their desired configuration.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A device for photographically recording an image projected on a television screen and viewed through a viewing window, comprising: a light-transmitting element, having a front face and a back face, which is adapted to be held manually in front of the television screen with the front face of said element in contact with the viewing window, said element being made from alternate strips of flat and corrugated paper with the edges of the strips substantially normal to said faces to provide a multiplicity of straight, parallel, open-ended, thin-walled tubes extending between and substantially normal to said faces, the individual tubes having a substantially smaller cross-sectional area than the area of the image to be recorded and the length of the individual tubes being substantially greater than their greatest cross-sectional dimension, thereby to limit light rays passing through said tubes to rays that are substantially parallel to the axes of said tubes; a sheet of light-sensitive film; supporting means for removably holding the film adjacent the back face of the light-transmitting element; and removable opaque means for covering the front face of the light-transmitting element before and after exposure of the film to a televised image in the manner indicated.

2. A device according to claim 1, in which the alternate strips of flat and corrugated paper are wound in a tight spiral configuration, so that the light-transmitting element has a substantially circular cross-section.

3. A device according to claim 1, in which the alternate strips of flat and corrugated paper are wound in a tight spiral configuration so that the light-transmitting element has a substantially circular cross-section, and in which the supporting means include a cylindrical container having an open top and an annular bottom portion and also include a removable disc disposed within the container and supported by said bottom portion, the film and light-transmitting element also being disposed in the container with the film between said element and the disc.

4. Apparatus according to claim 3, in which the front face of the light-sensitive element is substantially flush with the top of the container and in which the opaque means for covering the front face of said element is in the form of a closure cap for the top of the container.

References Cited

UNITED STATES PATENTS

| | | | |
|---|---|---|---|
| 1,848,814 | 3/1932 | Allen | 95—1.1 |
| 2,015,570 | 9/1935 | Sabbah et al. | 346—110 |
| 2,198,115 | 4/1940 | John | 88—24 |
| 3,007,049 | 10/1961 | McNaney | 346—110 |
| 3,060,805 | 10/1962 | Brumley | 88—24 |
| 3,138,663 | 6/1964 | McNaney | 346—110 |

OTHER REFERENCES

IBM Technical Discloseure Bulletin, "Information Patterns," P. J. O'Neill, vol. 6, No. 3, August 1963.

RICHARD B. WILKINSON, *Primary Examiner.*

M. LORCH, *Assistant Examiner.*